United States Patent
Chiu

(10) Patent No.: US 11,320,626 B2
(45) Date of Patent: May 3, 2022

(54) LENS AUTOFOCUS ACTUATING DEVICE

(71) Applicant: TDK TAIWAN CORP., Taoyuan (TW)

(72) Inventor: Chi-Wei Chiu, Taoyuan (TW)

(73) Assignee: TDK TAIWAN CORP., Taoyuan (TW)

(*) Notice: Subject to any disclaimer, the term of this patent is extended or adjusted under 35 U.S.C. 154(b) by 230 days.

(21) Appl. No.: 16/830,500

(22) Filed: Mar. 26, 2020

(65) Prior Publication Data

US 2020/0341233 A1 Oct. 29, 2020

(30) Foreign Application Priority Data

Apr. 26, 2019 (TW) .................................. 108114645

(51) Int. Cl.
*G02B 7/09* (2021.01)
*G02B 7/02* (2021.01)

(52) U.S. Cl.
CPC ............... *G02B 7/09* (2013.01); *G02B 7/026* (2013.01)

(58) Field of Classification Search
CPC ...... G02B 27/646; G02B 27/648; G02B 7/08; G02B 7/09; G02B 7/10; G02B 7/102; G02B 7/105; G02B 13/001; G02B 7/023; G02B 7/026; G02B 7/04; H04N 5/23248; H04N 5/23264; H04N 5/2328; H04N 5/23287
See application file for complete search history.

(56) References Cited

U.S. PATENT DOCUMENTS

| | | | |
|---|---|---|---|
| 2011/0279916 A1* | 11/2011 | Brown .................... | G02B 7/08 359/823 |
| 2014/0055630 A1* | 2/2014 | Gregory ............. | H04N 5/23258 348/208.2 |
| 2020/0393638 A1* | 12/2020 | Chiu ...................... | G03B 13/32 |

FOREIGN PATENT DOCUMENTS

| CN | 106054494 A | 10/2016 |
|---|---|---|
| TW | 200916872 A | 4/2009 |

OTHER PUBLICATIONS

Office Action dated Nov. 3, 2021 in CN Application No. 201910343142. 0, 8 pages.

* cited by examiner

*Primary Examiner* — Ephrem Z Mebrahtu
(74) *Attorney, Agent, or Firm* — Muncy, Geissler, Olds & Lowe, PC

(57) ABSTRACT

A lens autofocus actuating device includes a fixing ring, which is disposed on an upper surface of a base; a plurality of position limiting members, which is stood on the fixing ring; a lens carrier, which is disposed above the base and located between the position limiting members, wherein an outer side surface has a plurality of protrusions and cavities and a disposing space is consisted of one of the cavities and the corresponding position limiting member; an actuating member, which is disposed on the upper surface of the base and has two electrode terminal pairs and two shape-memory alloy wire; a plurality of balls, which is positioned in the corresponding disposing space and contact to the surfaces of the position limiting member and the cavity.

11 Claims, 4 Drawing Sheets

LENS AUTOFOCUS ACTUATING DEVICE

CROSS REFERENCE TO RELATED APPLICATIONS

This Non-provisional application claims priority under 35 U.S.C. § 119(a) on Patent Application No. 108114645 filed in Taiwan on Apr. 26, 2019, the entire contents of which are hereby incorporated by reference.

BACKGROUND

1. Technical Field

The present invention relates to a lens actuating device, in particular, to a lens autofocus actuating device cooperates with shape-memory alloy (SMA).

2. Description of Related Art

The autofocus actuating device of the mobile phone camera module is one of the integral standard configurations of current smart phone, which needs to move the lens module to complete autofocus during shooting.

The design of autofocus actuator involves a plurality of different technologies, including voice coil motor (VCM), piezoelectric motor and shape-memory alloy wire. Among them, the voice coil motor is most widely used at present, which has the advantages of low cost, high yield and mature technology but also shortcomings of slow focusing speed, large power consumption and magnetically interference, etc.; so a plurality of new technologies are still put forward and discussed. Compared with the voice coil motor, the shape-memory alloy has the advantages of low cost and large actuation force; however, due to the nonlinear deformation curve and input current as well as the hysteresis phenomenon, it is difficult to control the position with the shape-memory alloy.

The shape-memory alloy wire is characterized in that it can deform to change the length when heated by electric current and extend to original length when the electric current is switched off. Therefore, the focusing position of the lens module can be controlled by regulating the electric current of the shape-memory alloy wire.

But in the process of moving the lens module, the controlling of its dynamic tilt will affect the overall focusing effect and optical performance. Therefore, how to provide a lens autofocus actuating device that can control the dynamic tilt of the lens more accurately is one of the important subjects at present.

SUMMARY OF THE INVENTION

In view of the foregoing, one of the subjects of the present invention is to provide a lens autofocus actuating device, which can regulate the dynamic tilt of the lens in the process of focusing, and then execute the focusing control accurately.

To achieve the above, the present invention is to provide a lens autofocus actuating device, which includes a base, a guide rail unit, a lens carrier, an actuating member, a plurality of balls, a shell and two resilient members. The guide rail unit is disposed on an upper surface of the base and has a fixing ring and a plurality of position limiting members. The position limiting members are respectively stood on the fixing ring. The lens carrier is disposed above the base and located between the position limiting members, wherein an outer side surface has a plurality of protrusions and cavities and a disposing space is consisted of one of the cavities and the corresponding position limiting members. The actuating member is disposed on the upper surface of the base and has two electrode terminal pairs and two shape-memory alloy wires disposed opposite to each other. Each shape-memory alloy wire is in contact with a corresponding protrusion of the lens carrier, and the two ends of each shape-memory alloy wire are respectively connected to the electrodes of each group of electrode terminal pairs. The shape-memory alloy wires are driven by electric current to produce thermal deformation and then actuate the lens carrier to move relative to the base. Each group of balls is positioned in the corresponding disposing space and in contact to the surface of the position limiting members and the cavities. The shell is connected to the base to cover at least the guide rail unit, the lens carrier and the actuating member. The two (or even numbers) resilient members are disposed opposite to each other between an upper surface of the lens carrier and the shell, and provide a returning force to move the lens carrier toward the direction of the base after the shape-memory alloy wires are cooled.

In one embodiment of the present invention, the position limiting members are uniformly disposed on the fixing ring with the included angle of 120 degrees between them.

In one embodiment of the present invention, each position limiting member is L-shaped with the notch of L-shape faces the outer side surface of the lens carrier.

In summary, the lens autofocus actuating device of the present invention is to move the lens carrier relative to the base along the optical axis by using the guide rail unit and two groups of shape-memory alloy wire. In addition, the lens autofocus actuating device can limit the tilt angle of the lens carrier during moving by using the position limiting members of the guide rail unit that are uniformly disposed on the fixing ring together with each group of balls, so as to realize the more accurate autofocus of the lens.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

The parts in the drawings are not necessarily drawn to scale, the emphasis instead being placed upon clearly illustrating the principles of at least one embodiment. In the drawings, like reference numerals designate corresponding parts throughout the various diagrams, and all the diagrams are schematic.

DETAILED DESCRIPTION

Reference will now be made to the drawings to describe various inventive embodiments of the present disclosure in detail, wherein like numerals refer to like elements throughout.

Figure 1:
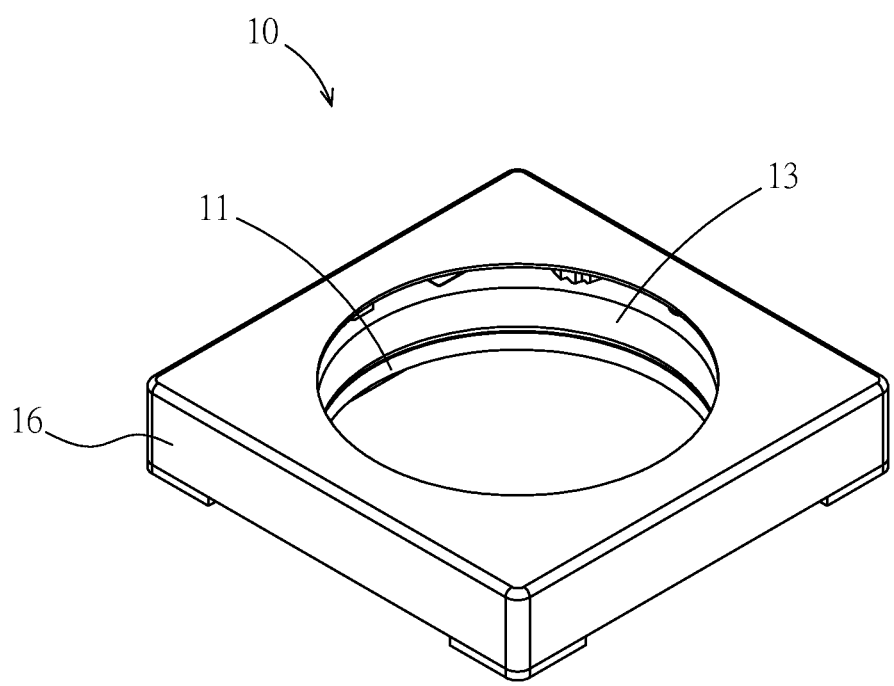
FIG. 1 is a schematic diagram showing an appearance of a lens autofocus actuating device according to a first embodiment of the present invention.
Figure 2:
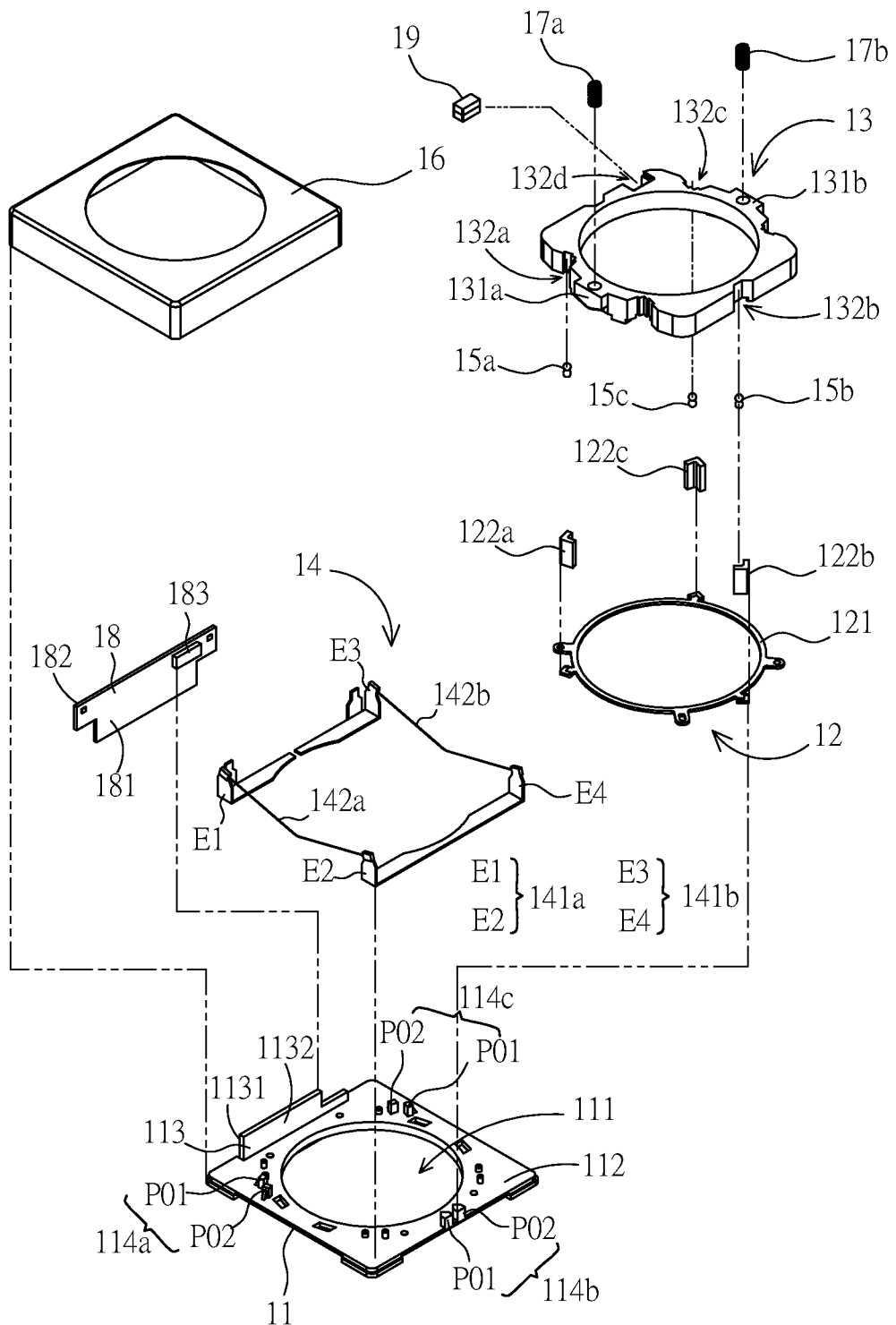
FIG. 2 is an exploded diagram showing the members of the lens autofocus actuating device according to the first embodiment of the present invention.
Figure 3:
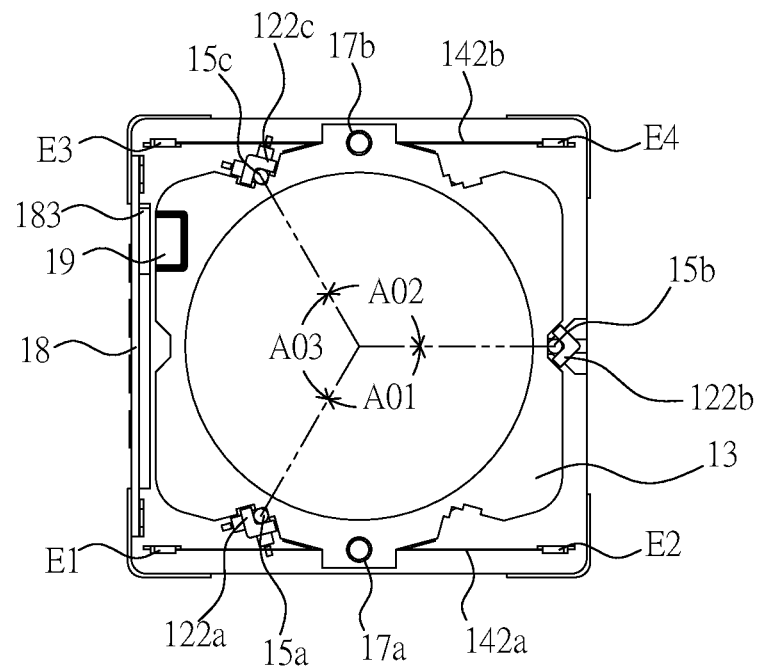
FIG. 3 is a top view diagram showing the lens autofocus actuating device according to the first embodiment of the present invention.
Figure 4:
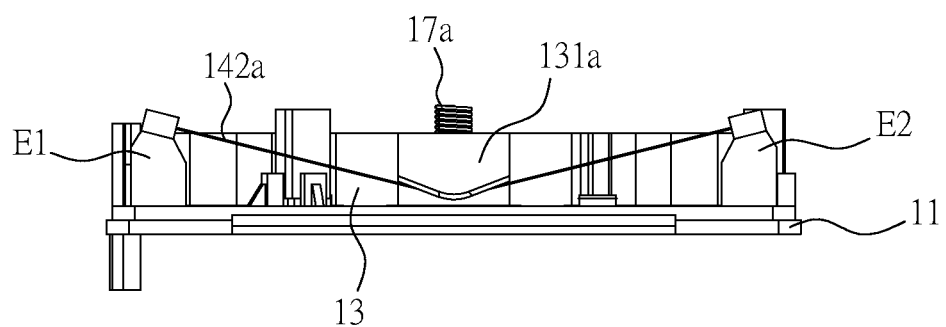
FIG. 4 is a side view diagram showing the lens autofocus actuating device according to the first embodiment of the present invention.

FIG. 1 is the appearance diagram for a lens autofocus actuating device 10 of the first embodiment in the present invention. FIG. 2 is the exploded diagram for the members of the lens autofocus actuating device 10. FIG. 3 is a top view diagram of the lens autofocus actuating device 10. FIG. 4 is a side view diagram of the lens autofocus actuating device 10.

Please refer to both FIG. 1 and FIG. 2, the lens autofocus actuating device 10 includes a base 11, a guide rail unit 12, a lens carrier 13, an actuating member 14, three groups of ball 15a, 15b and 15c, a shell 16, two resilient members 17a and 17b, a circuit board 18 and a magnetic member 19.

The base 11 is slightly in rectangular flat shape, and has a central through hole 111 in the center. An upper surface 112 of the base 11 is provided with a support plate 113 and three groups of positioning member 114a, 114b and 114c. The support plate 113 has a first surface 1131 and a second surface 1132, and is stood on one side of the rectangular base 11. The positioning members 114a, 114b and 114c are uniformly disposed on the upper surface 112 around the central through hole 111. Each group of positioning member has two adjacent protrusions P01 and P02.

The circuit board 18 has a first surface 181 and a second surface 182, and is stood on the upper surface 112 along one side of the base 11. In this embodiment, the circuit board 18 is a flexible printed circuit board (FPC), the first surface 181 of which is in contact with the first surface 1131 of the support plate 113 and fixed on the support plate 113. In addition, the first surface 181 of the circuit board 18 is further provided with a Hall sensing member 183, which is exposed on the second surface 1132 of the support plate 113. With this configuration, space can be effectively used to reduce the overall size within a limited scope. In other embodiments, circuit board with rigid support can also be used, so that the support plate on the base can be omitted. Furthermore, the circuit board 18 can also be provided with a current driving chip or a control chip.

The guide rail unit 12 includes a fixing ring 121 and three position limiting members 122a, 122b and 122c. The fixing ring 121 is disposed on the upper surface 112 of the base 11 corresponding to the central through hole 111, which is substantially located within the circular formed by three groups of positioning member 114a, 114b and 114c. The three position limiting members 122a, 122b and 122c are respectively stood on the fixing ring 121, and are uniformly disposed on the fixing ring 121. Please also refer to FIG. 3, the included angles A01, A02 and A03 between the three position limiting members 122a, 122b and 122c on the fixing ring 121 are about 120 degrees respectively.

In other embodiments, the number of position limiting member is not limited to three, which can be increased when the lens autofocus actuating device is enlarged or the material strength of the members is lower, and can be uniformly disposed around the central through hole. For example, when the number of position limiting member is four, the included angles between the members on the fixing ring 121 are respectively about 90 degrees.

It is further explained that the materials of the fixing ring 121 and the position limiting members 122a, 122b and 122c can be metal, plastic steel or plastic respectively. In addition, the position limiting members 122a, 122b and 122c are L-shaped respectively, which can be disposed on the fixing ring 121 by welding joint, gluing of curing adhesive, high-temperature welding or laser welding. In this embodiment, the L-shaped position limiting members are pressed against the protrusions P01 and P02 of the positioning members with its outer periphery so as to fix the position of the position limiting members.

The lens carrier 13 is disposed on the base 11, and is substantially located within the circular formed by the position limiting members 122a, 122b and 122c. An outer side of the lens carrier 13 includes two protrusions 131a and 131b as well as four cavities 132a, 132b, 132c and 132d. The lens carrier 13 is used to connect the lens module (not shown in the figure), which can move along the optical axis in the space between the base 11 and the shell 16 after installation, so as to drive the lens module to move.

In this embodiment, the L-shaped position limiting members 122a, 122b and 122c are respectively disposed with their notches toward the outer side of the lens carrier 13. For details, the notch of the position limiting member 122a is corresponding to the cavity 132a, the notch of the position limiting member 122b is corresponding to the cavity 132b, and the notch of the position limiting member 122c is corresponding to the cavity 132c, and a disposing space is respectively formed between the corresponding position limiting member and cavity.

The actuating member 14 is disposed on the upper surface 112 of the base 11, and includes two groups of electrode terminal pair 141a and 141b as well as two groups of shape-memory alloy wire 142a and 142b. The electrode terminal pair 141a has a first electrode E1 and a second electrode E2, and the electrode terminal pair 141b has a third electrode E3 and a fourth electrode E4. The two ends of shape-memory alloy wire 142a are respectively connected to the first electrode E1 and the second electrode E2 (please also refer to FIG. 4), and the two ends of shape-memory alloy wire 142b are respectively connected to the third electrode E3 and the fourth electrode E4. The actuating member 14 can be actuated by the driving or controlling of a current drive chip or control chip on the circuit board 18.

Four electrodes E1, E2, E3 and E4 are respectively disposed at four corners of the rectangular base 11, and two groups of shape-memory alloy wire 142a and 142b are disposed opposite to each other on the two sides of the base 11. In addition, the middle section of the shape-memory alloy wire 142a is connected to the lower edge of the protrusion 131a of the lens carrier 13 (as shown in FIG. 4), and the middle section of the shape-memory alloy wire 142b is connected to the lower edge of the protrusion 131b of the lens carrier 13, according to which, the shape-memory alloy wires 142a and 142b are approximately V-shaped in the initial state. The length of shape-memory alloy wires 142a and 142b can be reduced by thermal deformation caused by electric current driving, which can move the lens carrier upward relative to the base; and the shape-memory alloy wires 142a and 142b will be cooled and extended to the original length when the electric current is switched off. Furthermore, the shrinkage of the shape-memory alloy wires 142a and 142b can be controlled by regulating the electric current, and then the position of the lens carrier 13 can be controlled. It is a prior art that the shape-memory alloy wires 142a and 142b are heated by the resistance generated by electric current, so the detailed description is omitted here.

In this embodiment, the first electrode E1, the second electrode E2, the third electrode E3 and the fourth electrode E4 are composed of conductive metal plates, wherein the second electrode E2 and the fourth electrode E4 are electrically connected with each other, which can be composed of the same conductive metal plate and can be used for grounding.

Each group of balls 15a, 15b and 15c are disposed in the corresponding disposing space, which can be made of materials with low friction coefficient like metal (such as stainless steel) or precision ground ceramics. And the balls are in contact with the surface of the position limiting members 122a, 122b and 122c as well as the surface of the cavities 132a, 132b and 132c respectively. The balls 15a, 15b and 15c can be limited within the disposing space respectively by the position limiting members 122a, 122b, 122c and the cavities 132a, 132b and 132c of the lens carrier 13. When the lens carrier 13 is driven by the actuating member 14, the balls 15a, 15b and 15c can roll relative to each other stably between the position limiting members 122a, 122b and 122c and the cavities 132a, 132b and 132c of the lens carrier 13.

The shell 16 is connected to the base 11 to form a disposing space, in which the above members are covered. The outer shape of the shell 16 to match with the base is also slightly rectangular and the material of the shell 16 is metal in this embodiment.

It is worth mentioning that the shell 16, the fixing ring 121 and the lens carrier 13 respectively has through hole corresponding to the central through hole 111 of the base 11, so that light can be transmitted to an image sensor through these through holes after the lens module is assembled.

Two resilient members 17a and 17b are disposed opposite to each other between the upper surface 112 of the lens carrier 13 and the shell 16, and provide a returning force to move the lens carrier 13 toward the direction of the base 11 after the shape-memory alloy wires 142a and 142b are cooled. It is further explained that if the resilient members 17a and 17b are compression springs, the two ends can be respectively connected and fixed to the lens carrier 13 and the shell 16 through the fixing members (not shown in the figure). Thus, when the lens carrier 13 is driven by the shape-memory alloy wires 142a and 142b, the resilient members 17a and 17b will store elastic force due to deformation, which will be released and executed on the lens carrier when the driving of the shape-memory alloy wires 142a and 142b on the lens carrier 13 is discharged so that the lens carrier 13 will move toward the direction of the base 11.

Figure 5:
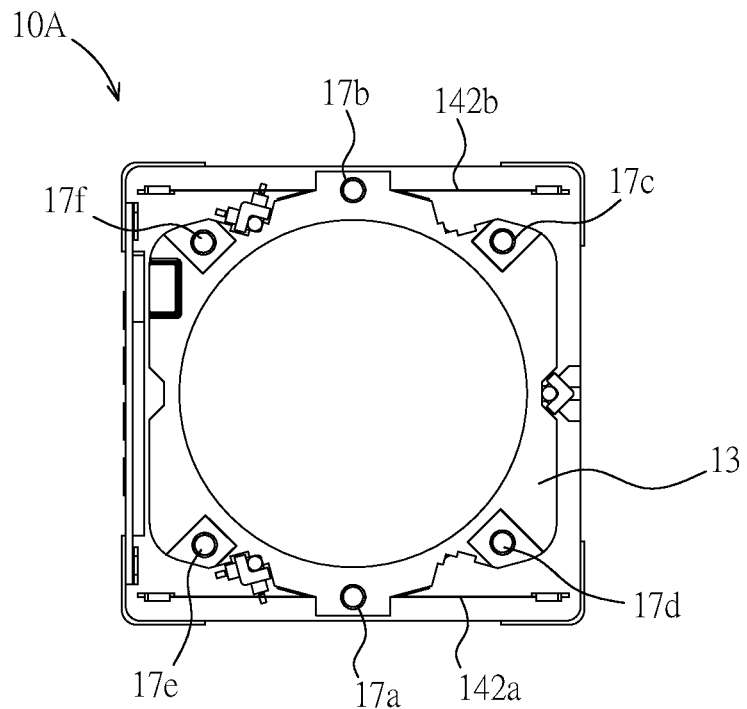
FIG. 5 is a top view diagram showing a lens autofocus actuating device according to a second embodiment of the present invention.
Figure 6:
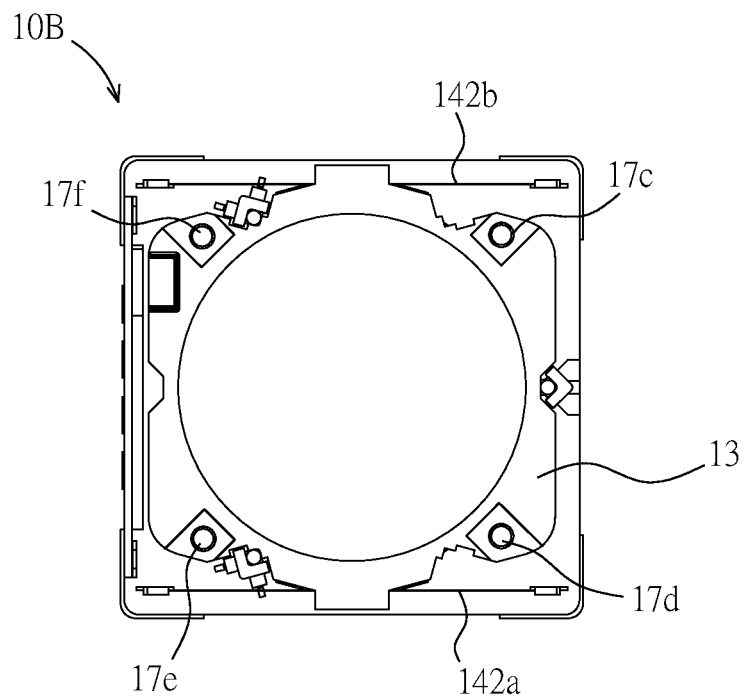
FIG. 6 is a top view diagram showing a lens autofocus actuating device according to a third embodiment of the present invention.

FIG. 5 is a lens autofocus actuating device 10A of the second embodiment. The difference from the lens autofocus actuating device 10 of the first embodiment is that the lens autofocus actuating device 10A has four resilient members 17c~17f in addition to the resilient members 17a~17b. FIG. 6 is a lens autofocus actuating device 10B of the third embodiment. The difference from the lens autofocus actuating device 10A of the second embodiment is that the lens autofocus actuating device 10B only has four resilient members 17c~17f located at even intervals. As mentioned above, an even number of resilient members may provide a more even returning force to the lens carrier 13. In addition, a larger number of resilient members may result in a more stable movement of the lens carrier 13.

In conclusion, the lens autofocus actuating device provided by the present invention is to form a dual-wire autofocus actuating member with two groups of shape-memory alloy wire, which can be independently controlled on the two sides of the lens module. In addition, three groups of ball in conjunction with the position limiting members can be used to regulate the dynamic tilt when the lens carries drives the lens module to move up and down. Moreover, the lens autofocus actuating device can also be used as a closed-loop control of position feedback with the Hall sensing members and magnetic members, so as to realize more accurate autofocus.

Even though numerous characteristics and advantages of certain inventive embodiments have been set out in the foregoing description, together with details of the structures and functions of the embodiments, the disclosure is illustrative only. Changes may be made in detail, especially in matters of arrangement of parts, within the principles of the present disclosure to the full extent indicated by the broad general meaning of the terms in which the appended claims are expressed.

What is claimed is:

1. A lens autofocus actuating device, comprises:
   a base, which has an upper surface;
   a guide rail unit, which is disposed on the upper surface of the base and comprises:
      a fixing ring; and
      a plurality of position limiting members, which are respectively stood on the fixing ring;
   a lens carrier; which is disposed above the base and located between the position limiting members, wherein an outer side surface has a plurality of cavities and a disposing space is consisted of one of the cavities and the corresponding position limiting members;
   an actuating member, which is disposed on the upper surface of the base and has two electrode terminal pairs and two shape-memory alloy wires disposed opposite to each other, wherein each shape-memory alloy wire is in contact with a corresponding protrusion of the lens carrier, and the two ends of each shape-memory alloy wire are respectively connected to the electrodes of each group of electrode terminal pairs, wherein the shape-memory alloy wires are driven by electric current to produce thermal deformation and then actuate the lens carrier to move relative to the base;
   a plurality of balls, which are divided in a plurality groups, wherein each group of balls is positioned in the corresponding disposing space and in contact to the surface of the position limiting members and the cavities;
   a shell, which is connected to the base to cover at least the guide rail unit, the lens carrier and the actuating member; and
   two resilient members, which are disposed opposite to each other between an upper surface of the lens carrier and the shell, and provide a returning force to move the lens carrier toward the direction of the base after the shape-memory alloy wires are cooled.

2. The lens autofocus actuating device of claim 1, wherein the position limiting members are uniformly disposed on the fixing ring.

3. The lens autofocus actuating device of claim 2, wherein the included angle between each of position limiting members is 120 degrees.

4. The lens autofocus actuating device of claim 1, wherein each position limiting member is L-shaped with the notch of L-shape faces the outer side surface of the lens carrier.

5. The lens autofocus actuating device of claim 1, wherein the material of the fixing ring of the guide rail unit and the position limiting members is metal, plastic steel or plastic.

6. The lens autofocus actuating device of claim 1, wherein the fixing ring of the guide rail unit is contacted with the position limiting members by welding joint, gluing of curing adhesive, high-temperature welding or laser welding.

7. The lens autofocus actuating device of claim 1, wherein each of two electrode terminal pairs has two electrodes, one of the electrodes of the two electrode terminal pairs is electrically connected to each other.

8. The lens autofocus actuating device of claim 1, further comprises:
- a circuit board, which is disposed on a side of the lens carrier and is stood on the upper surface of the base, with a Hall sensing member electrically connected with it; and
- a magnetic member, which is disposed facing the Hall sensing member in a cavity on the outer side of the lens carrier.

9. The lens autofocus actuating device of claim 1, wherein the base further has a plurality group of positioning members, which are respectively disposed corresponding to each position limiting member on the upper surface of the base for the positioning of these position limiting members.

10. The lens autofocus actuating device of claim 1, wherein the material of the balls is metal or precision ground ceramics.

11. The lens autofocus actuating device of claim 1, wherein the number of resilient members is even.

\* \* \* \* \*